(12) United States Patent
Stefik et al.

(10) Patent No.: US 8,452,781 B2
(45) Date of Patent: May 28, 2013

(54) SYSTEM AND METHOD FOR USING BANDED TOPIC RELEVANCE AND TIME FOR ARTICLE PRIORITIZATION

(75) Inventors: Mark J. Stefik, Portola Valley, CA (US); Sanjay Mittal, Fremont, CA (US); Lance E. Good, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 598 days.

(21) Appl. No.: 12/360,823

(22) Filed: Jan. 27, 2009

(65) Prior Publication Data
US 2010/0191741 A1    Jul. 29, 2010

(51) Int. Cl.
*G06F 17/30* (2006.01)

(52) U.S. Cl.
USPC ............... 707/749; 707/758; 707/781

(58) Field of Classification Search
CPC ................. G06F 17/30; G06F 17/00
See application file for complete search history.

(56) References Cited

U.S. PATENT DOCUMENTS

| | | | | |
|---|---|---|---|---|
| 4,081,301 A | * | 3/1978 | Buell | 156/164 |
| 4,249,547 A | * | 2/1981 | Hinzmann | 131/94 |
| 4,282,889 A | * | 8/1981 | Dahlgrun | 131/281 |
| 4,368,743 A | * | 1/1983 | Barbe et al. | 131/88 |
| 4,403,619 A | * | 9/1983 | Dahlgrun | 131/280 |
| 4,445,519 A | * | 5/1984 | Hinz et al. | 131/94 |
| 5,135,008 A | * | 8/1992 | Oesterling et al. | 131/94 |
| 5,257,939 A | | 11/1993 | Robinson et al. | |
| 5,369,763 A | | 11/1994 | Biles | |
| 5,530,852 A | | 6/1996 | Meske et al. | |
| 5,671,342 A | * | 9/1997 | Millier et al. | 345/418 |
| 5,680,511 A | | 10/1997 | Baker et al. | |
| 5,724,567 A | * | 3/1998 | Rose et al. | 707/999.002 |
| 5,778,583 A | * | 7/1998 | Larsen | 40/637 |
| 5,784,608 A | | 7/1998 | Meske et al. | |
| 5,907,677 A | | 5/1999 | Glenn et al. | |
| 5,907,836 A | * | 5/1999 | Sumita et al. | 707/754 |
| 5,940,821 A | * | 8/1999 | Wical | 1/1 |
| 5,953,732 A | | 9/1999 | Meske et al. | |
| 6,021,403 A | * | 2/2000 | Horvitz et al. | 706/45 |
| 6,052,657 A | * | 4/2000 | Yamron et al. | 704/9 |

(Continued)

FOREIGN PATENT DOCUMENTS

| | | |
|---|---|---|
| EP | 1571579 | 9/2005 |
| WO | 2005073881 | 8/2005 |
| WO | 2007047903 | 4/2007 |

OTHER PUBLICATIONS

C. Holahan, "So Many Ads, So Few Clicks," BusinessWeek, p. 38 (Nov. 12, 2007).

(Continued)

*Primary Examiner* — Farhan Syed
(74) *Attorney, Agent, or Firm* — Patrick J. S. Inouye

(57) ABSTRACT

A system and method for using banded topic relevance and time for article prioritization is provided. Articles of digital information and at least one social index are maintained. The social index includes topics that each relate to one or more of the articles. Fine-grained topic models matched to the digital information for each topic are retrieved. The articles are succinctly classified under the topics using the fine-grained topic models. Each of the articles is relevancy scored within the topic under which the article was classified. The articles are arranged into discrete bands by relevance score. The articles are temporally sorted within the discrete bands. The articles are presented within the discrete bands.

14 Claims, 17 Drawing Sheets

U.S. PATENT DOCUMENTS

| | | | |
|---|---|---|---|
| 6,064,952 A * | 5/2000 | Imanaka et al. | 704/9 |
| 6,233,570 B1 * | 5/2001 | Horvitz et al. | 706/11 |
| 6,233,575 B1 | 5/2001 | Agrawal et al. | |
| 6,240,378 B1 * | 5/2001 | Imanaka et al. | 704/9 |
| 6,247,002 B1 | 6/2001 | Steels | |
| 6,269,361 B1 | 7/2001 | Davis et al. | |
| 6,285,987 B1 | 9/2001 | Roth et al. | |
| 6,292,830 B1 * | 9/2001 | Taylor et al. | 709/224 |
| 6,390,099 B1 * | 5/2002 | Dombek | 131/27.1 |
| 6,397,211 B1 | 5/2002 | Cooper | |
| 6,598,045 B2 * | 7/2003 | Light et al. | 1/1 |
| 6,772,120 B1 | 8/2004 | Moreno et al. | |
| 6,804,688 B2 | 10/2004 | Kobayashi et al. | |
| 6,981,040 B1 | 12/2005 | Konig et al. | |
| 7,062,485 B1 * | 6/2006 | Jin et al. | 1/1 |
| 7,092,888 B1 | 8/2006 | McCarthy et al. | |
| 7,200,606 B2 | 4/2007 | Elkan | |
| 7,275,061 B1 | 9/2007 | Kon et al. | |
| 7,281,022 B2 | 10/2007 | Gruhl et al. | |
| 7,293,019 B2 | 11/2007 | Dumais et al. | |
| 7,320,000 B2 | 1/2008 | Chitrapura et al. | |
| 7,426,557 B2 | 9/2008 | Gruhl et al. | |
| 7,467,202 B2 | 12/2008 | Savchuk | |
| 7,496,567 B1 * | 2/2009 | Steichen | 1/1 |
| 7,548,917 B2 | 6/2009 | Nelson | |
| 7,567,959 B2 | 7/2009 | Patterson | |
| 7,600,017 B2 * | 10/2009 | Holtzman et al. | 709/224 |
| 7,685,224 B2 | 3/2010 | Nye | |
| 7,707,206 B2 | 4/2010 | Encina et al. | |
| 7,747,593 B2 | 6/2010 | Patterson et al. | |
| 7,809,723 B2 | 10/2010 | Liu et al. | |
| 7,818,194 B2 * | 10/2010 | Yoshida et al. | 705/7.32 |
| 7,890,485 B2 | 2/2011 | Malandain et al. | |
| 2002/0161838 A1 | 10/2002 | Pickover et al. | |
| 2002/0178394 A1 * | 11/2002 | Bamberger et al. | 714/1 |
| 2002/0179105 A1 * | 12/2002 | Zawadzki et al. | 131/365 |
| 2002/0179106 A1 * | 12/2002 | Zawadzki et al. | 131/365 |
| 2004/0059708 A1 | 3/2004 | Dean et al. | |
| 2005/0097436 A1 | 5/2005 | Kawatani | |
| 2005/0226511 A1 | 10/2005 | Short | |
| 2005/0278293 A1 | 12/2005 | Imaichi et al. | |
| 2006/0167930 A1 | 7/2006 | Witwer et al. | |
| 2006/0213976 A1 * | 9/2006 | Inakoshi et al. | 235/380 |
| 2006/0253441 A1 * | 11/2006 | Nelson | 707/7 |
| 2007/0050356 A1 * | 3/2007 | Amadio | 707/5 |
| 2007/0156622 A1 | 7/2007 | Akkiraju et al. | |
| 2007/0214097 A1 * | 9/2007 | Parsons et al. | 706/12 |
| 2007/0239530 A1 | 10/2007 | Datar et al. | |
| 2007/0244690 A1 | 10/2007 | Peters | |
| 2007/0260508 A1 | 11/2007 | Barry et al. | |
| 2007/0260564 A1 | 11/2007 | Peters et al. | |
| 2007/0271086 A1 | 11/2007 | Peters et al. | |
| 2008/0040221 A1 | 2/2008 | Wiseman et al. | |
| 2008/0065600 A1 | 3/2008 | Batteram et al. | |
| 2008/0126319 A1 | 5/2008 | Bukai et al. | |
| 2008/0133482 A1 | 6/2008 | Anick et al. | |
| 2008/0140616 A1 * | 6/2008 | Encina et al. | 707/3 |
| 2008/0201130 A1 | 8/2008 | Peters et al. | |
| 2008/0275849 A1 * | 11/2008 | Basu et al. | 707/3 |
| 2008/0307326 A1 | 12/2008 | Gruhl et al. | |
| 2009/0099839 A1 * | 4/2009 | Stefik | 704/9 |
| 2009/0099996 A1 * | 4/2009 | Stefik | 706/54 |
| 2010/0042589 A1 * | 2/2010 | Smyros et al. | 707/3 |
| 2010/0057536 A1 * | 3/2010 | Stefik et al. | 705/10 |
| 2010/0057577 A1 * | 3/2010 | Stefik et al. | 705/14.73 |
| 2010/0057716 A1 * | 3/2010 | Stefik et al. | 707/5 |
| 2010/0058195 A1 * | 3/2010 | Stefik et al. | 715/744 |
| 2010/0070485 A1 * | 3/2010 | Parsons et al. | 707/709 |
| 2010/0083131 A1 * | 4/2010 | You | 715/745 |
| 2010/0114561 A1 | 5/2010 | Yasin | |
| 2010/0125540 A1 * | 5/2010 | Stefik et al. | 706/12 |
| 2010/0191741 A1 * | 7/2010 | Stefik et al. | 707/748 |
| 2010/0191742 A1 * | 7/2010 | Stefik et al. | 707/748 |
| 2010/0191773 A1 * | 7/2010 | Stefik et al. | 707/797 |
| 2010/0257186 A1 * | 10/2010 | Dewar et al. | 707/749 |
| 2010/0278428 A1 | 11/2010 | Terao | |
| 2011/0047213 A1 * | 2/2011 | Manuel | 709/204 |

OTHER PUBLICATIONS

Rocha L. M., "Adaptive Webs for Heterarchies With Diverse Communities of Users," Workshop From Intelligent Networks to the Global Brain: Evolutionary Technology, pp. 1-35 (Jul. 3, 2001).

Arasu et al., "Searching the Web," ACM, New York, NY, US, pp. 2-43 (Aug. 1, 2001).

Imai et al., "Improved Topic Discrimination of Broadcast News Using a Model of Multiple Simultaneous Topics," 1997 IEEE International Conference on Acoustics, Speech, and Signal Processing (ICASSP'97), Apr. 1997, pp. 727-730, vol. 2.

Anonymous "TF-IDF," Wikipedia, the free encyclopedia (Jul. 23, 2007).

Akiko Aizawa, "An Information-Theoretic Perspective of TF-IDF Measures," Information Processing and Management, Elsevier Science Ltd. , vol. 39, No. 1, pp. 45-65 (Jan. 1, 2003).

C. Anderson, "The Long Tail: Why the Future of Business is Selling Less of More," 2006, Chapter 1, pp. 1-26, Hyperion Press, New York.

Schutze H., "The Hypertext Concordance: A Better Back-of-the-Book Index," 1998, Proceedings of Workshop on Computational Technology, pp. 101-104, Montreal, Canada.

Arampatzis et al., "An Evaluation of Linguistically-Motivated Indexing Schemes," 2000, Proceedings of the BCSIRSG.

Biebricher et al., "The Automatic Indexing System AIR/PHYS—1997, From Research to Application," In Readings in Information Retrieval, Morgan Kaufmann Publishers, San Francisco.

G. Sacco, "Dynamic Taxonomies and Guided Searches," Journal of the American Society for Information Science and Technology, vol. 57, Issue 6, Apr. 2006.

Brin et al., "The Anatomy of a Large-Scale Hypertextual Web Search Engine," Paper presented at the Seventh International Conference on World Wide Web. Apr. 14-18, 1998, Brisbane, Australia.

Card et al., "Readings in Information Visualization: Using Vision to Think," 1999, Section 3 Interaction, pp. 231-259, 295-306, Morgan Kaufmann Publishers, San Francisco.

Chi et al., "EBooks With Indexes that Reorganize Conceptually," Paper presented at Human Factors in Computing Systems Conference Apr. 24-29, 2004, Vienna, Austria.

G. W. Furnas, "Generalized Fisheye Views," Paper presented at the Conference on Human Factors in Computing Systems, 1986, Boston, Massachusetts.

Kusek et al., "The Future of Music: Manifesto for the Digital Music Revolution," Boston: Berklee Press, 2005.

P. Pirolli, "Information Foraging Theory: Adaptive Interaction with Information," Oxford: Oxford University Press, 2007.

H. Simon, "Designing Organizations for an Information-Rich World." In Communications and the Public Interest, ed. Martin Greenberger. 37-72. The Johns Hopkins Press, 1971.

R. D. Burt, "Structural Holes and Good Ideas," American Journal of Sociology, vol. 110, No. 2, pp. 349-399, 2003.

C. Mezei, "The Digg Algorithm-Unofficial FAQ," SeoPedia, www.secopedia.org/tips-tricks/social-media/the-digg-algorithm-unofficial-faq, Nov. 2, 2006.

N. Patel, "There's More to Digg Than Meets the Eye," Pronet Advertising, www.pronetadvertising.com/articles/theres-more-to-digg-than-meets-the-eye.html, Jan. 15, 2007.

J. Dowdell et al., "Digg's Kevin Rose on Recent Indiggnation: Fact vs. Fiction," Marketing Shift, www.marketingshift.com/200619/diggs-kevin-rose-recent-indiggnation.cfm, Sep. 7, 2006.

G. A. Miller, "The Magical Number Seven, Plus or Minus Two: Some Limits on Our Capacuty for Processing Information," Psychological Review, vol. 63, pp. 81-97, 1956.

J. Dowdell, "Digg Algorithm for Scoring Stories," Marketing Shift, www.marketingshift.com/2006/9/diggs-algorithm-elements-confirmed.cfm, Sep. 8, 2006.

P. Lenssen, "How Google News Indexes". See http://blogoscoped.com/archive/2006-07-28-n49.html.

A. Agarval, "How Google News works". http://labnol.blogspot.com/2005105/how-google-news-works.html.

M. Helft, "How a Series of Mistakes Hurt Shares of United". New York Times. http://www.nytimes.com/2008/09/15/technology/15google.html?_r=1.

Nakashima et al., "Information Filtering for the Newspaper," 1997 IEEE Pacific RIM Conference NCE on Victoria, BC, Canada (Aug. 20-22, 1997), vol. 1, pp. 142-145 (Aug. 1997).

Yuan Xue et al., "An Effective News Recommendation in Social Media Based on Users' Preference," 2008 International Workshop on Education Technology and Training and 2008 International Workshop on Geoscience and Remote Sensing, IEEE, Piscataway, NJ, USA, pp. 627-631 (Dec. 21, 2008).

Bracewell et al., "Reading: A Self Sufficient Internet News System with Applications in Information and Knowledge Mining," Natural Language Processing and Knowledge Engineering, International Conference, IEEE, PI, pp. 190-196 (Aug. 1, 2007).

K. Lerman, "Social Information Processing in News Aggregation," IEEE Computer Society, vol. 11, No. 6, pp. 16-28 (Nov. 1, 2007).

G. Linden, "People Who Read This Article Also Read . . . " IEEE Spectrum, vol. 45, No. 3, pp. 46-60 (Mar. 1, 2008).

Yu et al, "PEBL: Positive Example Based Learning for Web Page Classification Using SVM," Proc. of ACM SIGKDD International Conference on Knowledge Discovery and Data Mining (2002).

* cited by examiner

SYSTEM AND METHOD FOR USING BANDED TOPIC RELEVANCE AND TIME FOR ARTICLE PRIORITIZATION

FIELD

This application relates in general to digital information search and sensemaking and, in particular, to a system and method for using banded topic relevance and time for article prioritization.

BACKGROUND

The Worldwide Web ("Web") is an open-ended digital information repository into which information is posted, with newer articles continually replacing less recent ones or beginning entirely new subjects of discussion. The information on the Web can, and often does, originate from diverse sources, including authors, editors, collaborators, and outside contributors commenting, for instance, through a Web log, or "Blog." Such diversity suggests a potentially expansive topical index, which, like the underlying information, continuously grows and changes. The diversity also suggests that some of the topics in the index may be more timely, that is, "hot," than others, which have since turned "cold" over an extended time period or have moved to the periphery of a topic.

Social indexing systems provide information and search services that organize evergreen information according to the topical categories of indexes built by their users. Topically organizing an open-ended information source, like the Web, into an evergreen social index can facilitate information discovery and retrieval, such as described in commonly-assigned U.S. Patent Application, entitled "System and Method for Performing Discovery of Digital Information in a Subject Area," Ser. No. 12/190,552, filed Aug. 12, 2008, pending, the disclosure of which is incorporated by reference.

Social indexes organize evergreen information by topic. A user defines topics for the social index and organizes the topics into a hierarchy. The user then interacts with the system to build robust models to classify the articles under the topics in the social index. The topic models can be created through example-based training, such as described in Id., or by default training, such as described in commonly-assigned U.S. Patent Application, entitled "System and Method for Providing Default Hierarchical Training for Social Indexing," Ser. No. 12/360,825, filed Jan. 27, 2009, pending, the disclosure of which is incorporated by reference. Example-based training results in fine-grained topic models generated as finite-state patterns that appropriately match positive training example articles and do not match negative training example articles, while default training forms topic models in a self-guided fashion based on a hierarchical topic tree using both the individual topic labels and their locations within the tree.

In addition, the system can build coarse-grained topic models based on population sizes of characteristic words, such as described in commonly-assigned U.S. Patent No. 8,010,545, issued Aug. 30, 2011, the disclosure of which is incorporated by reference. The coarse-grained topic models are used to recognize whether an article is roughly on topic. Articles that match the fine-grained topic models, yet have statistical word usage far from the norm of the positive training example articles are recognized as "noise" articles. The coarse-grained topic models can also suggest "near misses," that is, articles that are similar in word usage to the training examples, but which fail to match any of the preferred fine-grained topic models, such as described in commonly-assigned U.S. Provisional Patent Application, entitled "System and Method for Providing Robust Topic Identification in Social Indexes," Ser. No. 61/115,024, filed Nov. 14, 2008, pending, the disclosure of which is incorporated by reference.

Thus, social indexing systems display articles within a topically-organized subject area according to the fine-grained topics in the social index, which can be selected by a user through a user interface. The topical indexing and search capabilities of these systems help users to quickly access information on topics that they specify. However, these capabilities do not address how best to meet the different information goals of individual users, which can range from focusing on the latest "news," to catching up on recent topical articles that appeared over a few days, or to reading the most definitive articles on a topic.

The approaches used by online news, social media aggregation, and automated news aggregation Web sites, further described infra, rely on a single ordering of articles, which fails to meet the users' different information goals.

SUMMARY

Articles in a topic are grouped into and displayed by relevance bands, such as "centrally-relevant," "relevant," and "somewhat relevant," starting with the most relevant band. The articles are sorted by time within each band, and articles outside a time region are filtered out. This logic and simple control for presenting articles accommodates different user information goals and fits typical patterns of changing relevance along topic life cycles. The control does not require a novice user to articulate a complex search goal that prioritizes relevance or recency.

One embodiment provides a system and method for using banded topic relevance and time for article prioritization. Articles of digital information and at least one social index are maintained. The social index includes topics that each relate to one or more of the articles. Fine-grained topic models matched to the digital information for each topic are retrieved. The articles are succinctly classified under the topics using the fine-grained topic models. Each of the articles is relevancy scored within the topic under which the article was classified. The articles are arranged into discrete bands by relevance score. The articles are temporally sorted within the discrete bands. The articles are presented within the discrete bands.

Still other embodiments of the present invention will become readily apparent to those skilled in the art from the following detailed description, wherein are described embodiments byway of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screen shot diagram showing, by way of example, articles under two topics within a social index.

FIGS. 11-13 are screen shot diagrams showing, by way of example, articles displayed under the Digg® news system.

DETAILED DESCRIPTION

Glossary

Figure 1:
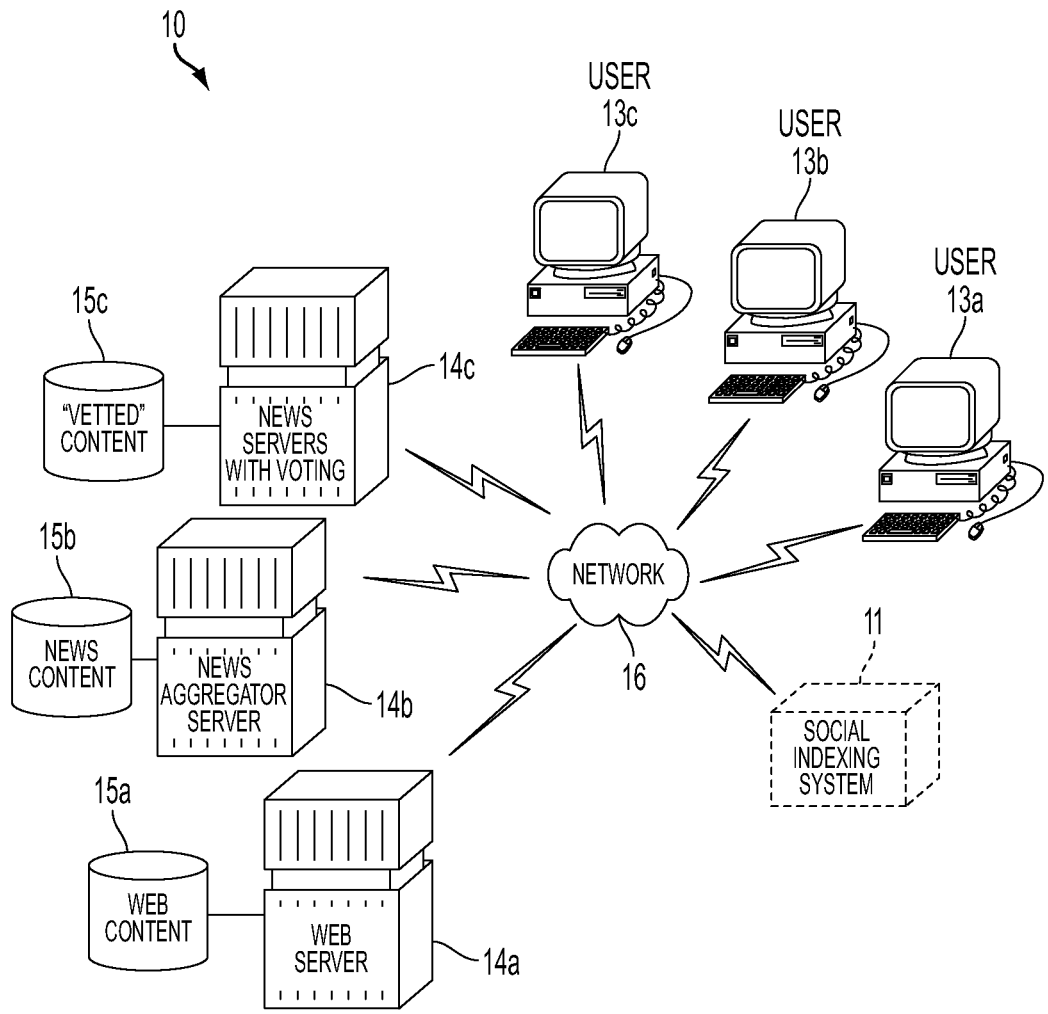
FIG. 1 is a block diagram showing an exemplary environment for digital information.

The following terms are used throughout and, unless indicated otherwise, have the following meanings:

Corpus: A collection or set of articles, documents, Web pages, electronic books, or other digital information available as printed material.

Document: An individual article within a corpus. A document can also include a chapter or section of a book, or other subdivision of a larger work. A document may contain several cited pages on different topics.

Cited Page: A location within a document to which a citation in an index, such as a page number, refers. A cited page can be a single page or a set of pages, for instance, where a subtopic is extended by virtue of a fine-grained topic model for indexing and the set of pages contains all of the pages that match the fine-grained topic model. A cited page can also be smaller than an entire page, such as a paragraph, which can be matched by a fine-grained topic model.

Subject Area: The set of topics and subtopics in a social index, including an evergreen index or its equivalent.

Topic: A single entry within a social index characterizing a topical category. In an evergreen index, a topic has a descriptive label and is accompanied.

Subtopic: A single entry hierarchically listed under a topic within a social index. In an evergreen index, a subtopic is also accompanied by one or more topic models.

Fine-grained topic model: This topic model is based on finite state computing and is used to determine whether an article falls under a particular topic. Each saved fine-grained topic model is a finite-state pattern, similar to a query. This topic model is created by training a finite state machine against positive and negative training examples.

Coarse-grained topic model: This topic model is based on characteristic words and is used in deciding which topics correspond to a query. Each saved coarse-grained topic model is a set of characteristic words, which are important to a topic, and a score indicating the importance of each characteristic word. This topic model is also created from positive training examples, plus a baseline sample of articles on all topics in an index. The baseline sample establishes baseline frequencies for each of the topics and the frequencies of words in the positive training examples are compared with the frequencies in the baseline samples. In addition to use in generating topical sub-indexes, coarse-grained models can be used for advertisement targeting, noisy article detection, near-miss detection, and other purposes.

Community: A group of people sharing main topics of interest in a particular subject area online and whose interactions are intermediated, at least in part, by a computer network. A subject area is broadly defined, such as a hobby, like sailboat racing or organic gardening; a professional interest, like dentistry or internal medicine; or a medical interest, like management of late-onset diabetes.

Augmented Community: A community that has a social index on a subject area. The augmented community participates in reading and voting on documents within the subject area that have been cited by the social index.

Evergreen Index: An evergreen index is a social index that continually remains current with the corpus.

Social Indexing System: An online information exchange infrastructure that facilitates information exchange among augmented communities, provides status indicators, and enables the passing of documents of interest from one augmented community to another. An interconnected set of augmented communities form a social network of communities.

Information Diet: An information diet characterizes the information that a user "consumes," that is, reads across subjects of interest. For example, in his information consuming activities, a user may spend 25% of his time on election news, 15% on local community news, 10% on entertainment topics, 10% on new information on a health topic related to a relative, 20% on new developments in their specific professional interests, 10% on economic developments, and 10% on developments in ecology and new energy sources. Given a system for social indexing, the user may join or monitor a separate augmented community for each of his major interests in his information diet.

Digital Information Environment

A digital information infrastructure includes public data networks, such as the Internet, standalone computer systems, and other open-ended repositories of electronically-stored information. FIG. 1 is a block diagram showing an exemplary environment 10 for digital information, which includes a social indexing system 11 that supports social indexing activities. A digital data communications network 16, such as the Internet, provides an infrastructure for exchange of digital information. Other digital information exchange infrastructures, for instance, a non-public corporate enterprise network, are possible. The network 16 provides interconnectivity to diverse and distributed information sources and consumers that respectively supply and consume the digital information. Authors, editors, collaborators, and outside contributors continually post articles, Web pages, and the like to the network 16, which are maintained as a distributed data corpus though Web servers 14*a*, news aggregator servers 14*b*, news servers with voting 14*c*, and other data repositories that serve as information sources. These sources respectively serve Web content 15*a*, news content 15*b*, community-voted or "vetted" content 15*c*, and other information to users that access the network 16 through user devices 13*a-c*, such as personal computers, as well as other servers that all function as information consumers. For simplicity, only user devices will be discussed, although servers and other non-user device information consumers may similarly search, retrieve, and use information in the corpus.

In general, each user device 13a-c is a Web-enabled device that executes a Web browser or similar application, which supports interfacing to and information exchange and retrieval with the servers 14a-c. Both the user devices 13a-c and servers 14a-c include components conventionally found in general purpose programmable computing devices, such as a central processing unit, memory, input/output ports, network interfaces, and non-volatile storage, although other components are possible. Moreover, other information sources in lieu of or in addition to the servers 14a-c, and other information consumers, in lieu of or in addition to user devices 13a-c, are possible.

A social indexing system 11 supplies articles topically organized under an evergreen index through social indexing, such as described in commonly-assigned U.S. Patent Application, entitled "System and Method for Performing Discovery of Digital Information in a Subject Area," Ser. No. 12/190, 552, filed Aug. 12, 2008, pending, the disclosure of which is incorporated by reference. The social indexing system 11 also determines which topics are currently "hot" and which topics have turned "cold" to meet a user's need for recent information, such as described in commonly-assigned U.S. Patent Application, entitled "System and Method for Managing User Attention by Detecting Hot and Cold Topics in Social Indexes," Ser. No. 12/360,834, filed Jan. 27, 2009, pending, the disclosure of which is incorporated by reference. Finally, the social indexing system 11 groups and displays articles by relevance bands, which are sorted by time and filtered by time regions, as further described below beginning with reference to FIG. 3.

Figure 2:
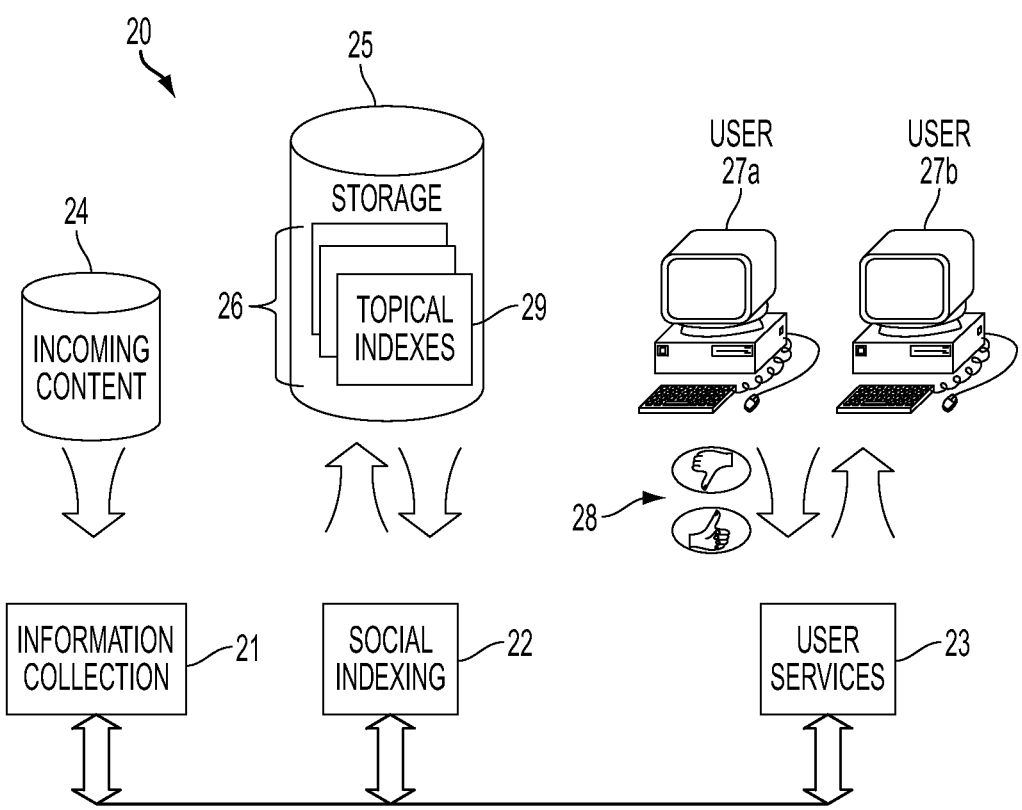
FIG. 2 is a functional block diagram showing principal components used in the environment of FIG. 1.

From a user's point of view, the environment 10 for digital information retrieval appears as a single information portal, but is actually a set of separate but integrated services. FIG. 2 is a functional block diagram showing principal components 20 used in the environment 10 of FIG. 1. Additional components may be required to provide other related digital information activities, such as digital information discovery, prospecting, orienting, and retrieval.

The components 20 can be loosely grouped into three primary functional modules, information collection 21, social indexing 22, and user services 23. Other functional modules are possible. Additionally, the functional modules can be implemented on the same or separate computational platform. Information collection 21 obtains incoming content 24, such as Web content 15a, news content 15b, and "vetted" content 15c, from the open-ended information sources, including Web servers 14a, news aggregator servers 14b, and news servers with voting 14, which collectively form a distributed corpus of electronically-stored information. The incoming content 24 is collected by a media collector to harvest new digital information from the corpus. The incoming content 24 can typically be stored in a structured repository, or indirectly stored by saving hyperlinks or citations to the incoming content in lieu of maintaining actual copies.

The incoming content 24 may be stored in multiple representations, which differ from the representations in which the information was originally stored. Different representations could be used to facilitate displaying titles, presenting article summaries, keeping track of topical classifications, and deriving and using fine-grained topic models. Words in the articles could also be stemmed and saved in tokenized form, minus punctuation, capitalization, and so forth. Moreover, fine-grained topic models created by the social indexing system 11 represent fairly abstract versions of the incoming content 24 where many of the words are discarded.

The incoming content 24 is preferably organized under at least one topical index 29 that is maintained in a storage device 25. The topical index 29 may be part of a larger set of topical indexes 26 that covers all of the information. The topical index 29 can be an evergreen index built through social indexing 22, such as described in commonly-assigned U.S. Patent Application "System and Method for Performing Discovery of Digital Information in a Subject Area," Ser. No. 12/190,552, filed Aug. 12, 2008, pending, the disclosure of which is incorporated by reference. The evergreen index contains fine-grained topic models, such as finite state patterns, that can be used to test whether new information falls under one or more of the topics in the index. Social indexing 22 applies supervised machine learning to bootstrap training material into the fine-grained topic models for each topic and subtopic in the topical index 29. Alternatively, social indexing 22 can perform default training to form topic models in a self-guided fashion based on a hierarchical topic tree using both the individual topic labels and their locations within the tree, such as described in commonly-assigned U.S. Patent Application, entitled "System and Method for Providing Default Hierarchical Training for Social Indexing," Ser. No. 12/360,825, filed Jan. 27, 2009, pending, the disclosure of which is incorporated by reference. Once trained, the evergreen index can be used for index extrapolation to automatically categorize new incoming content 24 into topics for pre-selected subject areas.

User services 23 provide a front-end to users 27a-b to access the set of topical indexes 26 and the incoming content 24, to perform search queries on the set of topical indexes 26 or a single topical index 29, and to access search results, top indexes, and focused sub-indexes. In a still further embodiment, each topical index 29 is tied to a community of users, known as an "augmented" community, which has an ongoing interest in a core subject area. The community "vets" information cited by voting 28 within the topic to which the information has been assigned.

Recent and Relevant Information Needs

Figure 3:
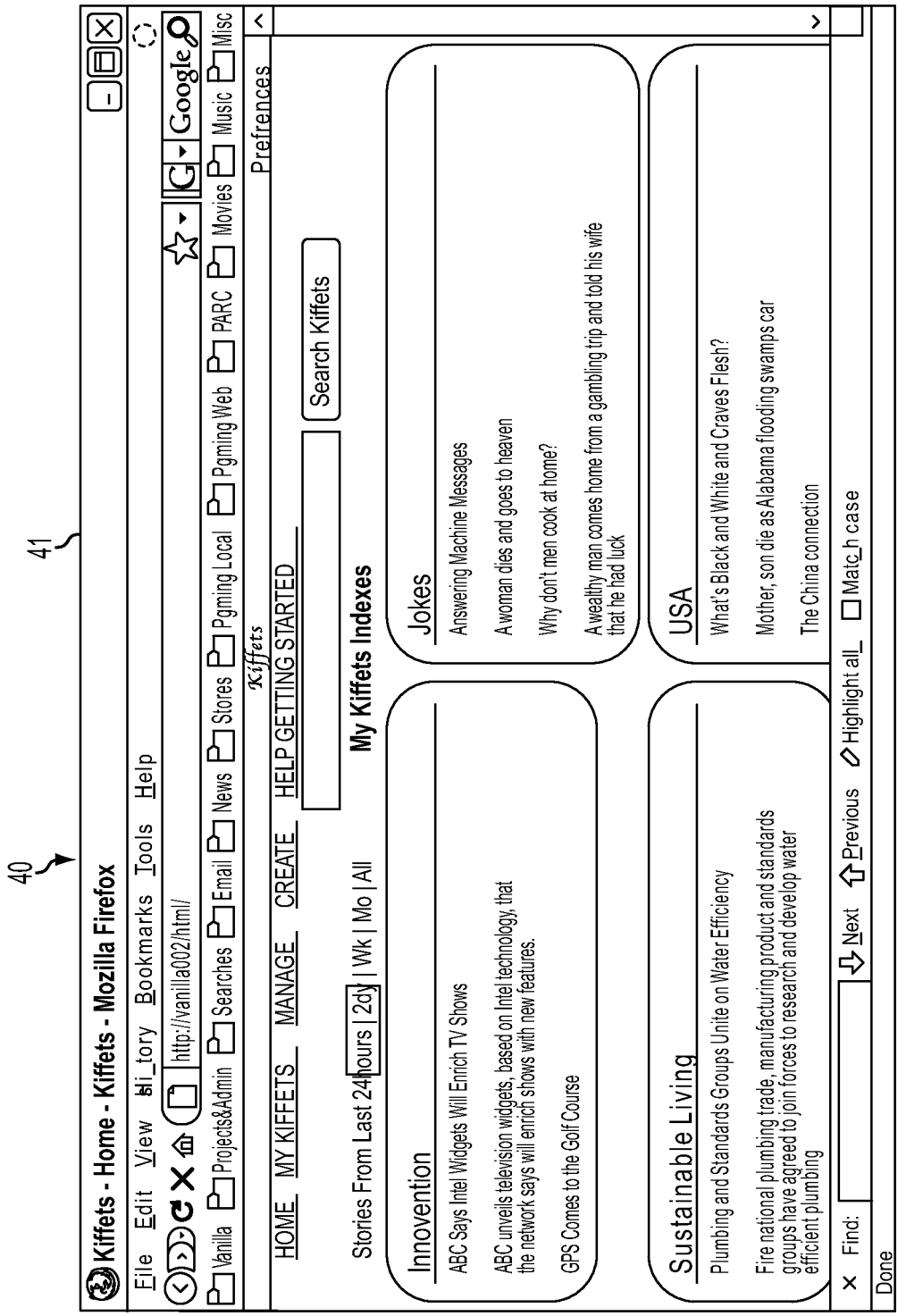
FIG. 3 is a screen shot diagram showing, by way of example, a social indexing system.

Like news services and information retrieval services, social indexes present summaries of selected articles. FIG. 3 is a screen shot diagram 40 showing, by way of example, a social indexing system 41. Article summaries are presented within the context of meeting particularized user information needs, which include:

Diverse User-defined Perspectives. Social indexes provide multiple, user-defined perspectives on information as reflected in indexes that organize information according to the specialized purposes of interest groups. Diverse perspectives are supported by competing and fluid topical organizational structures, such as "Innovation," "Sustainable Living," "Venture Capital Action," "Jokes," "USA," and "World News." Information may appear in a social index organized in multiple places for different purposes. Users within each interest group can define new organizations at any time.

Fine-grained topical organization. Social indexes are intended to cover information organized in potentially millions of subject areas. In addition, within each subject area of a social index, information is further organized into 40-50 fine-grained topics 52. These fine-grained topics are pre-defined and organized to provide a perspective on the information that is appropriate for understanding the subject area. The fine-grained organization of information in social indexes applies to all information, including the most recent information.

Recent information in a social indexing system is reported together with the fine-grained topical structure appropriate for each subject matter.

Archive Information versus Recent News. Social indexing systems collect information over extended periods of time. Supporting user access to archive information requires temporal analysis that distinguishes different temporal regions, such as very recent news, reasonably current information, and information that is old and possibly out-dated for particular purposes.

Figure 4:
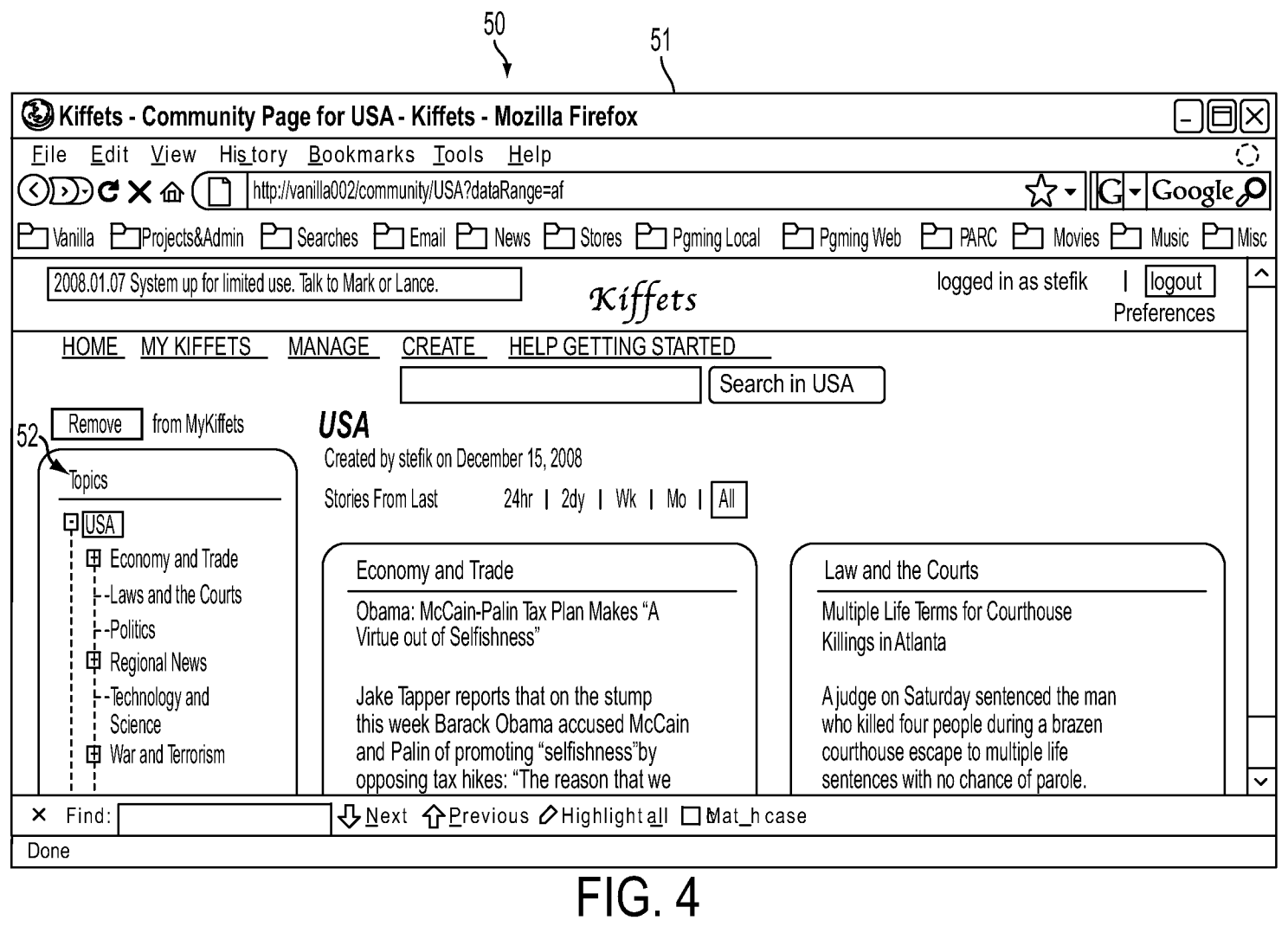

When individual users have particular information goals, some orderings of articles are better than others, especially as the order in which articles are displayed matters effects how long a user takes to reach particular information. FIG. 4 is a screen shot diagram 50 showing, by way of example, articles under two topics within a social index 51. The articles span an undefined period of time, for instance, chronicling the trial and sentencing of a criminal in Alabama. Although a chronological ordering of the articles worked in this particular case, in general, there is no single best ordering for articles on any given topic because each user may have different information goals. Moreover, even given a topical focus, different users can have divergent information goals, including:

Getting the most recent information on a topic, which can arise when a user wants to track recent events, such as news over the last hour or day.

Reviewing the most relevant ("center-of-topic") information, which can arise when a user wants to get familiarized with a topic.

A mixture of these two goals, which includes variations, such as catching up on the most relevant news that arrived during the last week.

Other information goals are possible.

Figure 5:
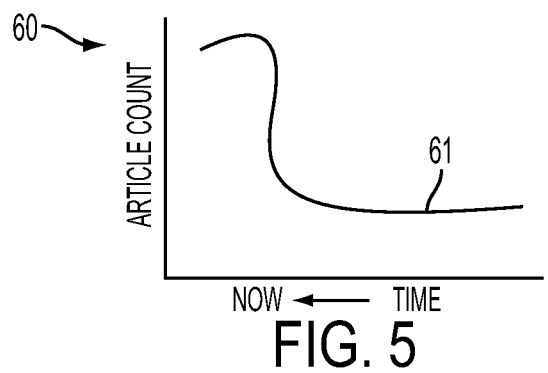
FIGS. 5-7 are graphs respectively showing, by way of example, patterns for hot, cold, and periodic topics.
Figure 6:
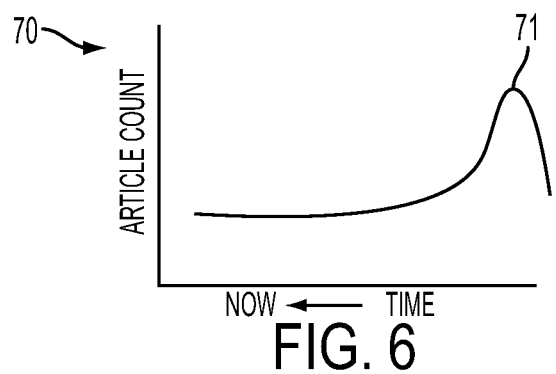
Figure 7:
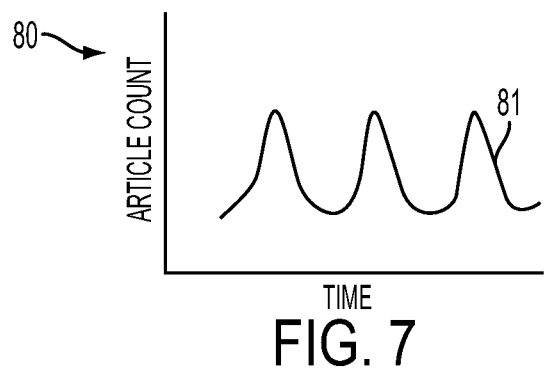

One way to try to meet these information goals is to provide a control that can sort articles by either time or relevance. However, some shortcomings of this approach become apparent in view of the life cycles of topics. FIGS. 5-7 are graphs 60, 70, 80 respectively showing, by way of example, patterns for hot, cold, and periodic topics 61, 71, 81. The x-axis represents time decrease away from the present and the y-axis represents the number of articles counted over one-day time periods. Referring first to FIG. 5, a topic becomes "hot" when a larger than normal number of articles arrives in a recent time interval. Various extrinsic factors can account for a topic becoming hot. For example, the announcement of a breakthrough or exciting product may trigger a marked increase in the number of articles, thereby making the corresponding topic hot. Similarly, a storm or natural disaster could lead to a flurry of articles. Besides article counts, signals, such as user votes and reputation measures, can be combined to create composite measures of topic hotness. Referring next to FIG. 6, a topic becomes "cold" when just a few on-topic articles have arrived over an extended time period or articles are only appearing on the topic's periphery. Finally, referring to FIG. 7, some topics heat up and cool down periodically. For example, news stories about the Olympic games and other sports events are reported on a periodic calendar basis, as are articles about government elections.

Figure 8:
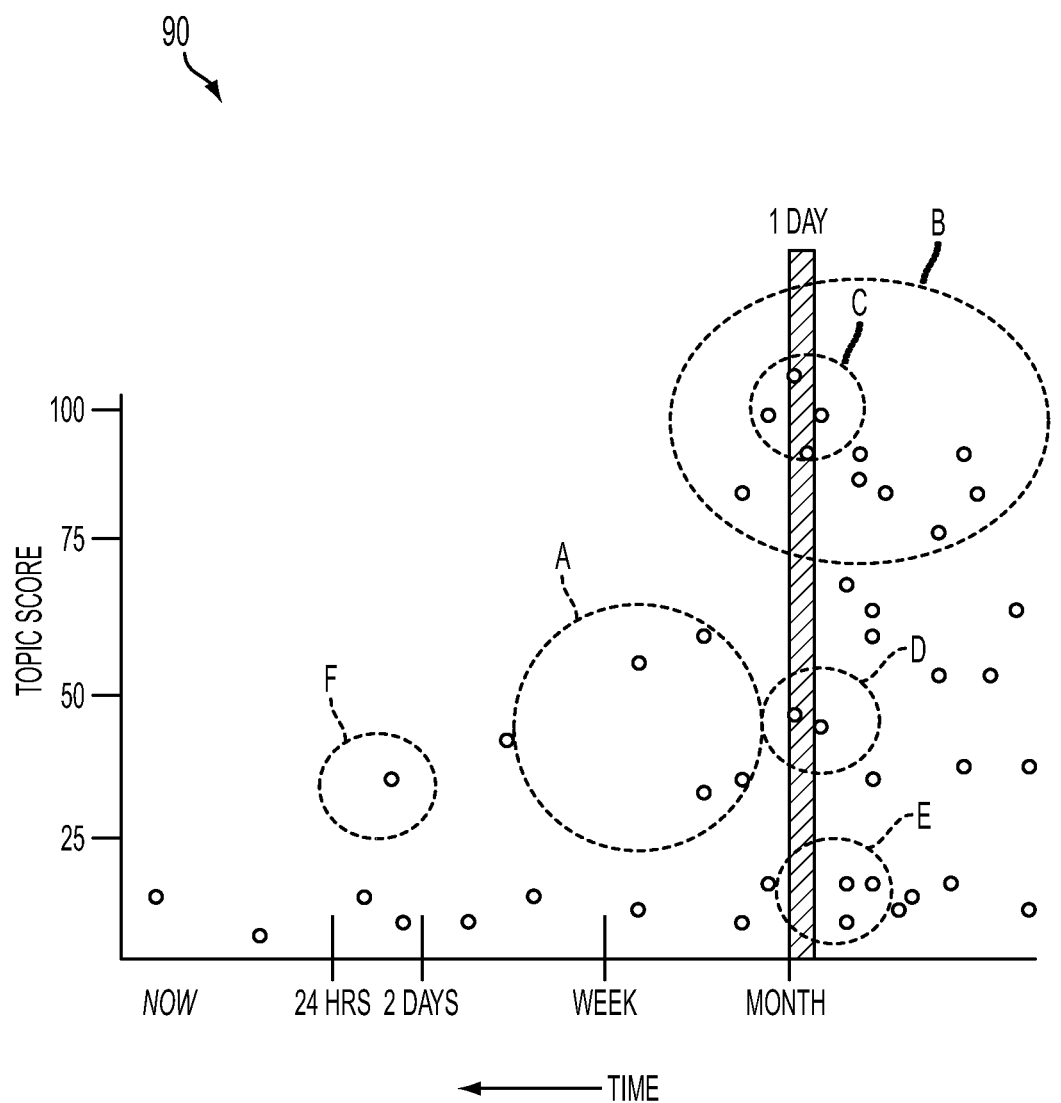
FIG. 8 is a graph showing, by way of example, article count and relevance decay for a cooling topic.

During the life cycle of a topic, the counts and relative relevance of articles under the topic can change. FIG. 8 is a graph 90 showing, by way of example, article count and relevance decay for a cooling topic. The x-axis represents time decreasing away from the present and the y-axis represents the topic scores as a measure of relevancy. The time scale is roughly logarithmic. The topic score is a linear metric, which registers one hundred points for articles at the center of a topic and approaches zero for articles at the fringes of the topic. Topic score can be computed using characteristic words, such as described in commonly-assigned U.S. Pat. No. 8,010,545, issued Aug. 30, 2011, the disclosure of which is incorporated by reference. A flurry of published articles appeared about one month prior to the present, when the topic was hot. However, there are fewer articles per unit time approaching the present. A noticeable shift in the topical relevance of the articles has also occurred. The most relevant articles appeared at the peak of numbers of articles and over the next period, the best new articles were of lower topical relevance. There is also a band of low topical relevance articles that makes up a kind of background noise.

The articles are grouped into clusters A, B, C, D, E, and F, which can be used to illustrate the typical goals for a "news reader" and a "relevance reader" on a cooling topic. These goals can be expressed as exemplary usage cases, which include:

Hot topic (as happening a month ago).
  Case 1: News reader. The article groups C, D, and E all include very recent articles on the hot topic. Even if some articles in groups D or E are earlier than the articles in group C, many readers would still prefer to see the articles in group C first. The articles in group E are so low in topic relevance that many readers would prefer not to see them at all.
  Case 2: Relevance reader. These readers want to see the available articles in group C first. If they are revisiting the news frequently to keep up on the hot topic, the readers would prefer to start with the newest articles in group C.

Cold topic (as happening in the present).
  Case 3: News reader. Some readers want to see the latest articles, while other readers prefer not to be distracted since no recent articles on the topic exist.
  Case 4: Relevance reader. Relevance readers want to first see the top articles in group C and would probably want to see the article in group F before comparable articles in groups A or D.

Recurring topic.
  Case 5: News reader. These readers want to see the articles on the latest cycle first and probably have little interest in older cycles.
  Case 6: Relevance reader. These readers are focused on the most topical articles. They prefer these articles to be organized coherently by cycle because recurrence patterns may reflect topical variations.

Two-day review (starting now).
  Case 7: News reader. There is a recent article in group F. Articles in groups A, B, C, D, and E are too old and should not be shown. Most readers have low interests in the lowest scoring articles.
  Case 8: Relevance reader. As these readers also want a two-day review, only the article in group F is of interest. The readers' goals are similar to those of a news reader goal in that articles are sorted temporally and limited over two days.

Some observations can be made from the cases:
  The reader goals are typically mixed, rather than pure. Considerations of time enter, even when relevance is the main focus and considerations of relevance arise, even when news is the main focus.
  When time is a critical preference, even small differences in time matter in ordering the articles. For example, when a reader is following breaking news, differences of a few hours or even minutes matter affect the reader's information goals and should be reflected in the order of presentation.

Relevance comparisons are more qualitative than quantitative. Large differences in relevance are important, but small differences are not. Articles that are significantly more topically-relevant should appear first.

There is little or no interest in articles of low relevance.

Conventional Approaches

Several alternative approaches unsatisfactorily attempt to satisfy user information needs with a single control. One approach provides a control that sorts the articles either by date or by topic. A second approach uses a degree-of-interest (DOI) function that combines relevance and age, together with a control that changes the emphasis between relevance and age. Still other approaches exist in online news Web sites. Each of these approaches is considered against the eight usage cases described supra.

Time and Relevance Sorting

One approach to meeting user goals is to enable the system to sort the articles, either by time or by relevance score, giving the user a control for selecting which priority by which to sort. Assuming that the system also filters out articles of marginal relevance, this approach satisfies only five of the eight usage cases:

Hot topic.
  Case 1: News reader. The user selects "sort by time." This option would satisfy the user's goals, yet mix up the quality of the articles.
  Case 2: Relevance reader. The user selects "sort by relevance." This option would partially satisfy the user's goals, although closely related articles would be time-scrambled.

Cold Topic.
  Case 3: News reader. The user selects "sort by time." This option would satisfy the user's goals.
  Case 4: Relevance reader. The user selects "sort by relevance." The system would show the top articles first, but would not show the most recent articles first for articles of comparable relevance. The approach does not satisfy the user's goal.

Recurring topic.
  Case 5: News reader. The user selects "sort by time." The system would show the most recent articles first, but would also show older articles.
  Case 6: Relevance reader. The user selects "sort by relevance." The system would show the most topical articles first, yet would scramble the time coherence of the articles. The approach does not satisfy the user's goal.

Two-day review.
  Case 7: News reader. The user selects "sort by time." The system would correctly show the most recent articles first, but would also show the less desired earlier articles.
  Case 8: Relevance reader. Neither sorting selection could satisfy the user's goals.

Degree-of-Interest with Date and Relevance Control

Another approach to meeting user goals is to use a DOI function that considers both relevance and article age. A typical approach uses a linear function to compute a score $Score_{DOI}$, such as:

$$Score_{DOI} = C + w_1 \times Relevance - w_2 \times Age \quad (1)$$

where C represents the article count, Relevance represents the topic's relevancy, and weights $w_1$ and $w_2$ respectively determine the relative influences of relevance and age. The articles are presented in order of descending DOI score.

In general, a DOI system is intended to work without any additional user controls for prioritizing the score. However, since a news reader's and a relevance reader's goals are in conflict, no fixed values for the weights $w_1$ and $w_2$ can satisfy both kinds of readers at the same time and additional user controls would be required to adjust to each of these readers needs. Alternatively, the DOI system could include a control to emphasize either time or relevance, but that control effectively converts the DOI system into a time and relevance sorting system, as described supra. This approach fails on the same cases as the previous approach, time-and-relevance sorting.

Other Related Approaches

Other related approaches to meeting user goals can be found in online news Web sites, such as provided by the Reddit®, Google News™ Archive, and Digg® Web sites. These approaches present articles with time-period controls.

Figure 9:
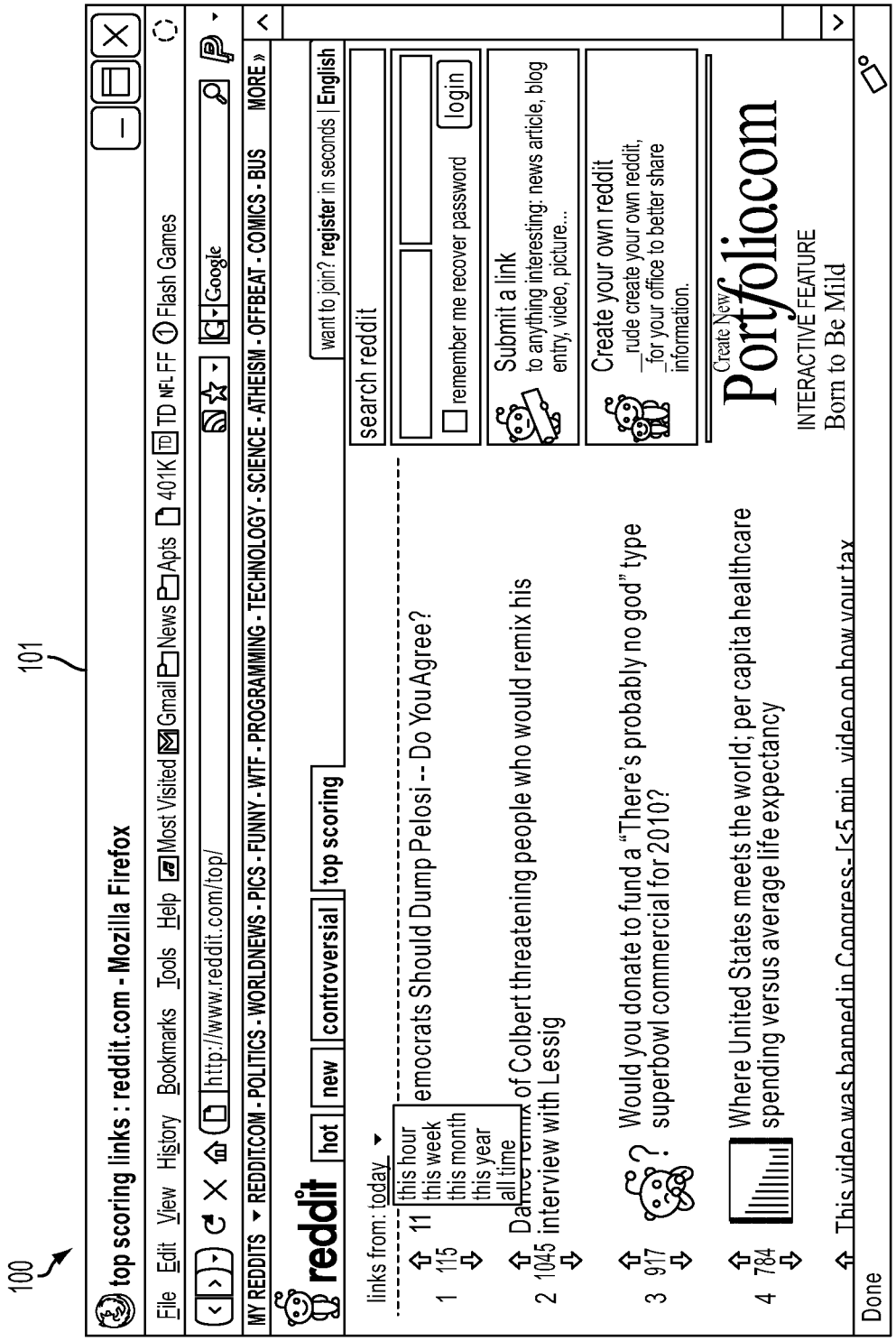
FIG. 9 is a screen shot diagram showing, by way of example, articles displayed under the Reddit® social news system.

The Reddit® Web site presents articles with a time-filter control. FIG. 9 is a screen shot diagram 100 showing, by way of example, articles displayed under the Reddit® social news system 101. The articles are scored using what appears to be a DOI function, where the weights are set to mainly sort by score. As well, while the Web site offers a time-period control, articles are sorted by their score and not by time. Moreover, Reddit® is social media aggregation Web site, not a social indexing system. As a result, Reddit® topically-organizes articles under a few broad subject areas, rather than many subject areas that are sub-organized into fine-grained topics. As well, articles are added to a subject area manually by people, rather than by an automated classification system and article scoring in a subject area is also performed by human voting, rather than by an automated topical analysis. Finally, Reddit® does not provide banding of scores or sorting by time within the bands.

Reddit does poorly on usage cases where time-coherence is needed for the articles over an extended period of time. For example, Reddit® fails usage Case 1 (hot topic, news reader) when the reader wants to see the latest articles, or the time-evolution of the articles. For similar reasons, Reddit® also fails usage Case 3 (cold topic, news reader) and usage Case 5 (recurring topic, news reader). Moreover, under usage Case 1, a news reader could just set Reddit® to a one-hour or one-day time window to filter articles that were beyond the current time, but no articles would be shown at all if the articles available to Reddit® failed to be sufficiently recent enough. Conversely, if a news reader specified a wider time window, the most recent articles would be listed after the highest scoring articles, forcing the reader to manually search for the latest articles.

Figure 10:
FIG. 10 is a screen shot diagram showing, by way of example, articles displayed under the Google News™ Archive system.

Google News™ Archive Web site presents articles matching a query with a control for a time period. FIG. 10 is a screen shot diagram 110 showing, by way of example, articles displayed under the Google News™ Archive system 111. Articles are displayed with large variance in topics and the dates of the articles are significantly out-of-sequence, which makes the order of presentation of articles topically and temporally incoherent.

Under Google News™ Archive, articles are presented in an order based on match scoring, but does not seem to sort articles by time. As well, like Reddit®, Google News™ Archive is not a social indexing system and fails usage Cases 1, 3, and 5 for the same reasons as Reddit®. Google® News Archive presents articles matching a user query, rather than articles falling within a topical index. Finally, Google News™ Archive does not provide banding of scores or sorting by time within the bands.

Figure 11:
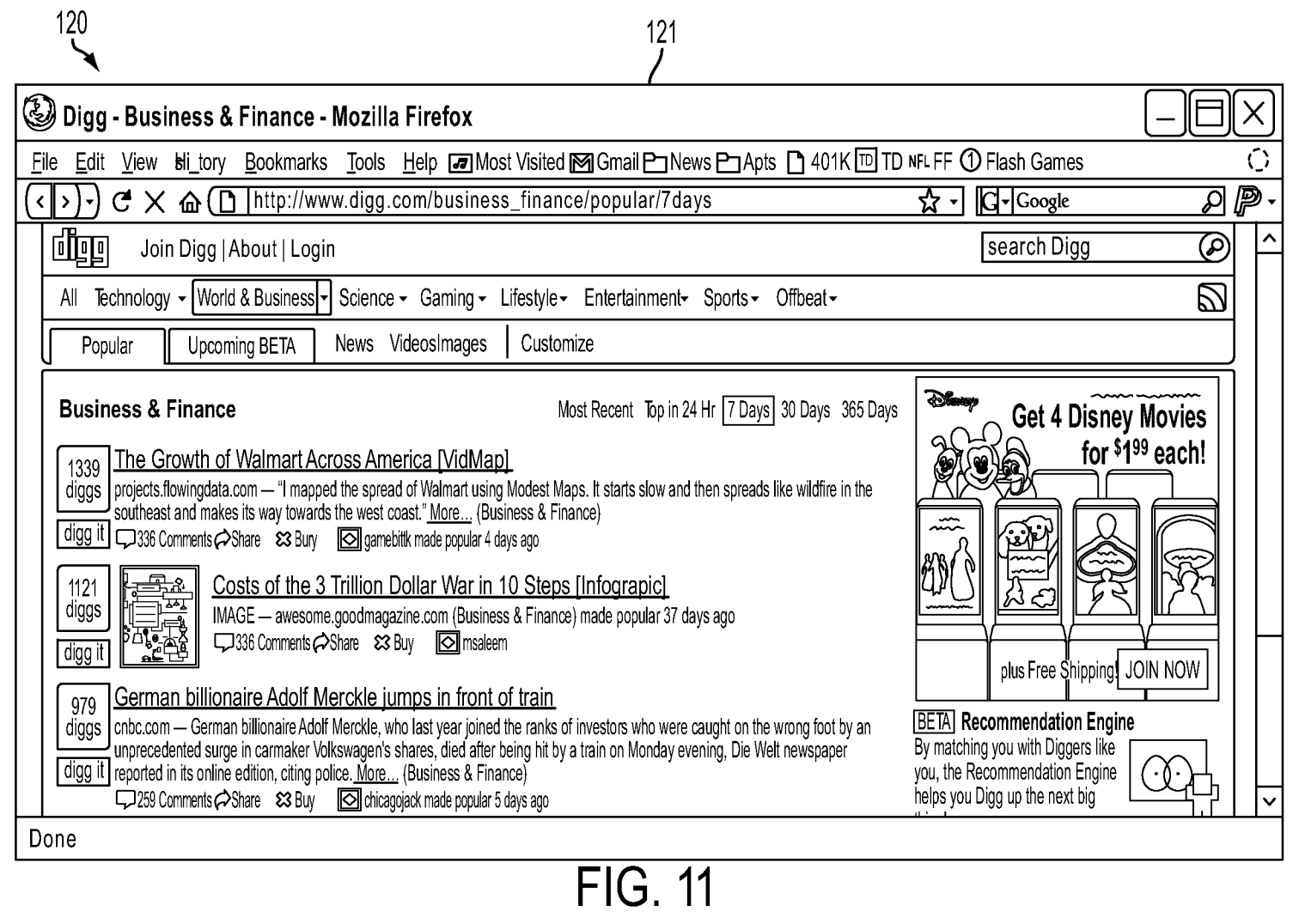
Figure 12:
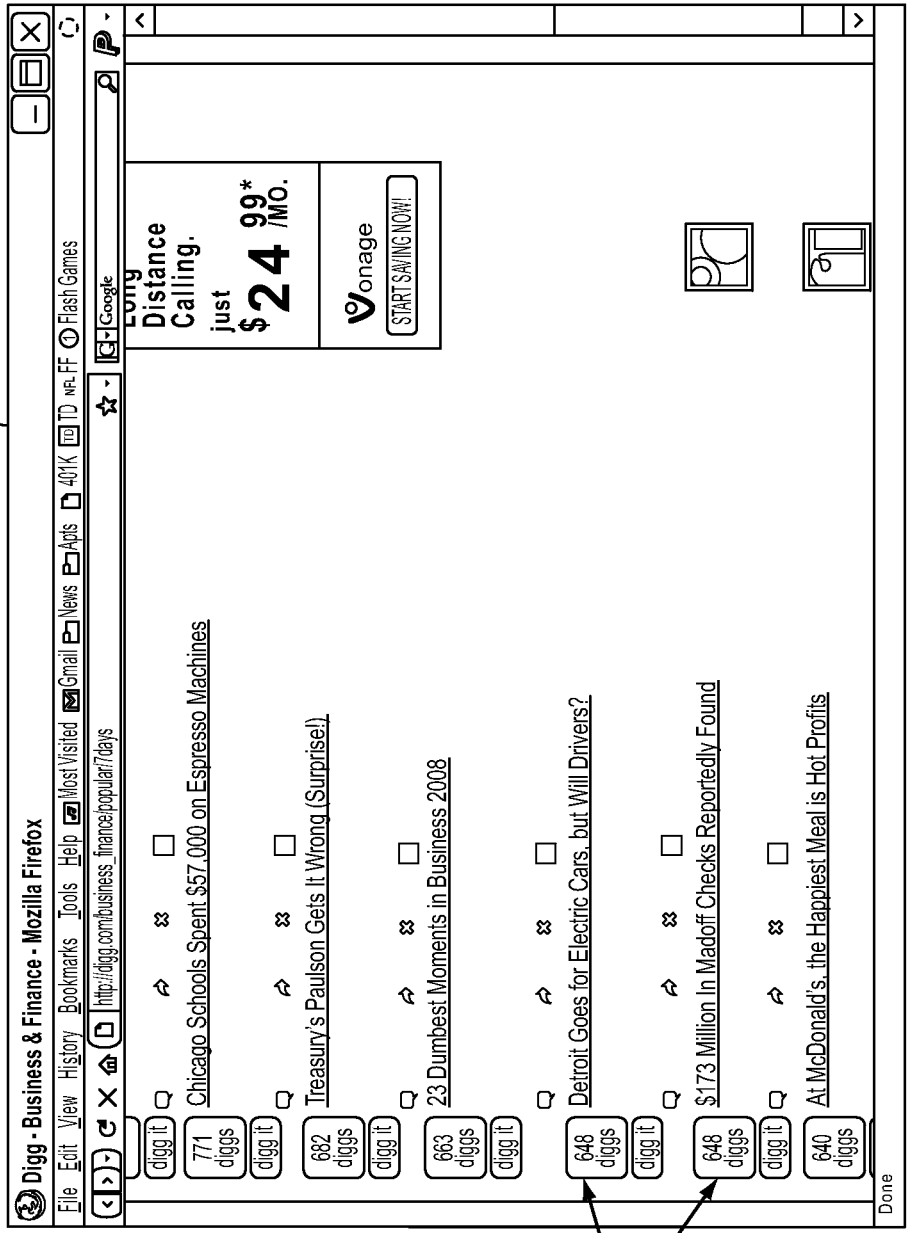
Figure 13:
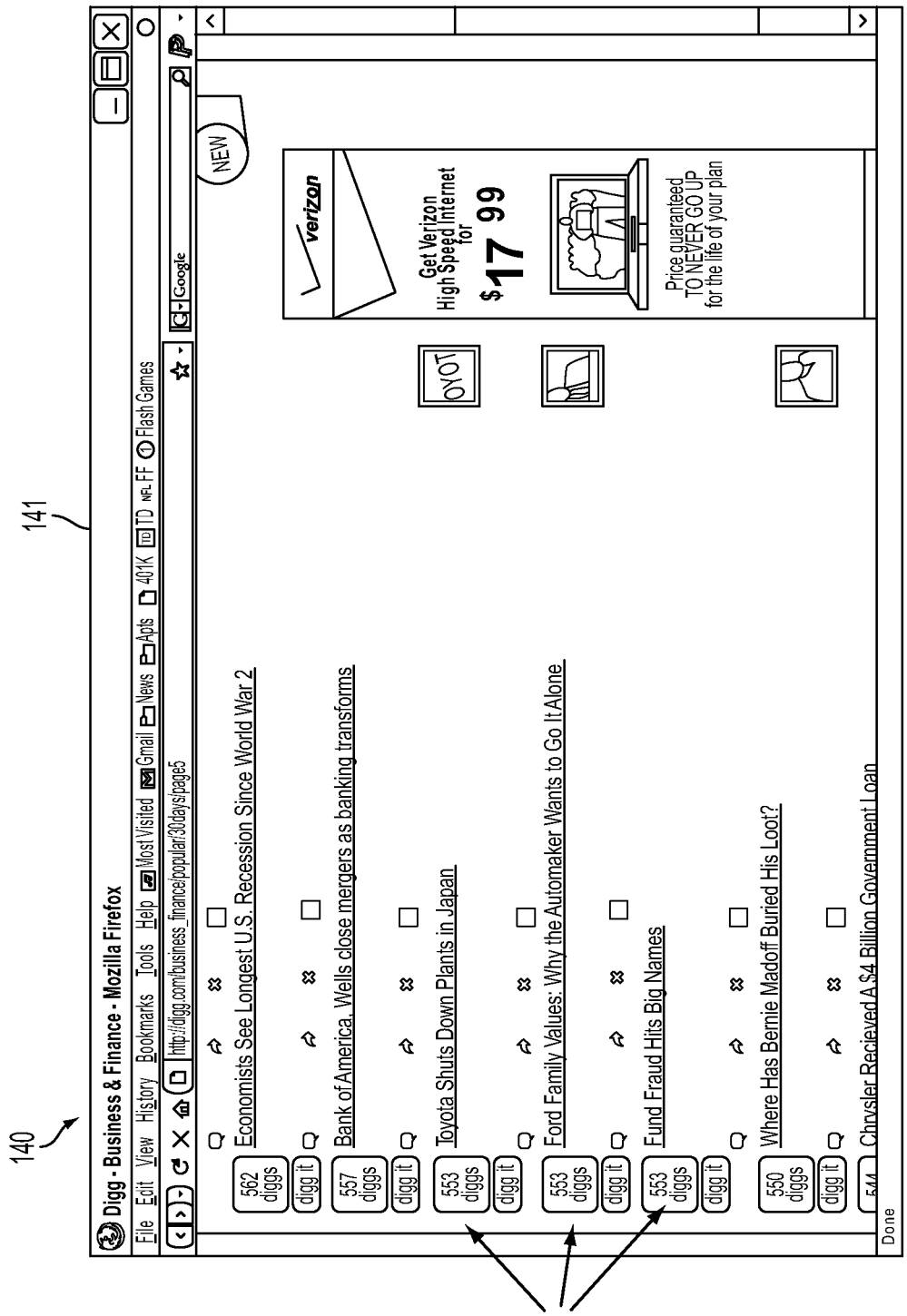

Finally, the Digg® Web site presents articles within broad subject areas with a control for a time period. FIGS. 11-13 are screen shot diagrams 120, 130, 140 showing, by way of example, articles displayed under the Digg® news system 121, 131, 141. Articles are presented ordered by user votes. When articles have exactly the same score, Digg® sorts the tied articles by time. The ordering of the articles reflects a wide variance in topic and large jumps in date, which makes the order of presentation of articles topically and temporally incoherent.

Under Digg®, only those articles matching a specific user query are presented, rather than all articles falling within a topical index. As well, like Reddit®, Digg® is not a social indexing system and fails usage Cases 1, 3, and 5 for the same reasons Reddit®. Digg® also does not provide banding of scores or sorting by time within the bands. The secondary sorting by date happens only for scores with the same number of votes. As articles can potentially receive thousands of votes, tied-article grouping is not the same as grouping articles into a few broad bands.

Banded Topic Relevance and Time for Article Prioritization

Figure 14:
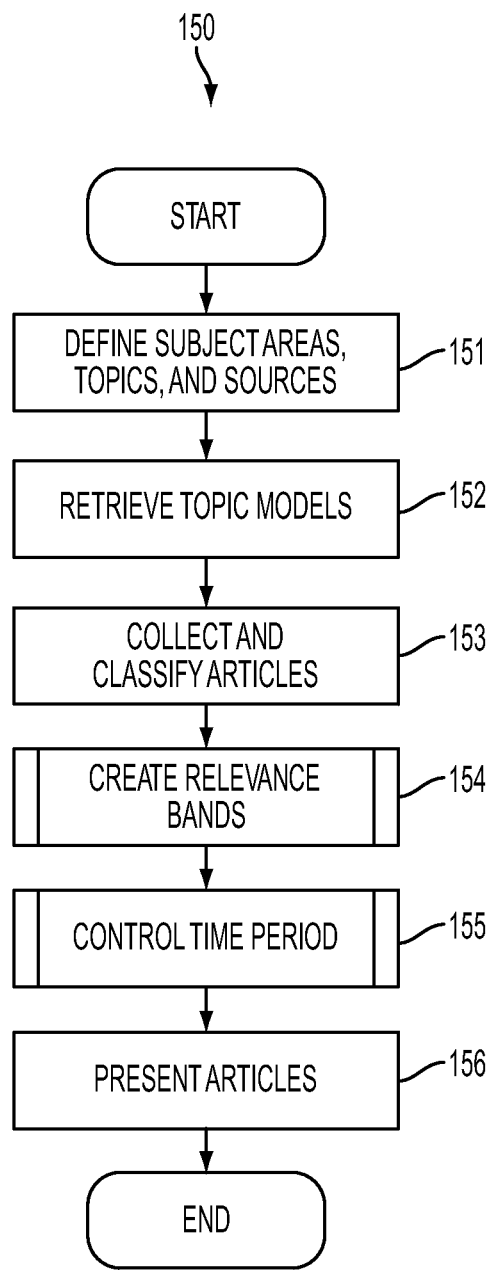
FIG. 14 is a flow diagram showing a method for using banded topic relevance and time for article prioritization in accordance with one embodiment.

Different user information goals and typical patterns of changing relevance along topic life cycles can be accommodated by providing an appropriate time control combined with automated relevance ordering. FIG. 14 is a flow diagram showing a method 150 for using banded topic relevance and time for article prioritization in accordance with one embodiment. The method is performed as a series of process or method steps performed by, for instance, a general purpose programmed computer, such as server.

To begin, subject areas, topics within the subject areas, and sources of information must be defined (step 151), all of which can be provided by one or more social indexes. The social indexes can be created by a user as a hierarchically-structured topic tree to specify the index topics, or can originate from some other index source. Topic models for each topic are retrieved (step 152). The topic models are used to recognize articles and to classify newly-arriving articles by topic, which renders the social index evergreen. Each article includes both the article's content and publication date, or other indication of recency. The social index contains fine-grained topic models, such as finite state patterns, that can be used to test whether new information falls under one or more of the topics in the index. To supplement the fine-grained topic models. the social index can optionally include coarse-grained topic models are used to broadly classify the articles by recognizing whether an article is roughly on topic. Thereafter, articles are collected and succinctly classified into the social index from the information sources using the fine-grained topic models (step 153). The relevance bands for the fine-grained topics are created (step 154), as further described below with reference to FIG. 16. A time control that limits the articles to a particular period is then applied (step 155), as further described below with reference to FIG. 18. Finally, the articles as grouped into relevance bands and time sorted are presented through a user interface (step 156) by first presenting articles from the highest relevance band in time order and so forth for each remaining band, except for a "not relevant" band, which can be omitted.

Figure 15:
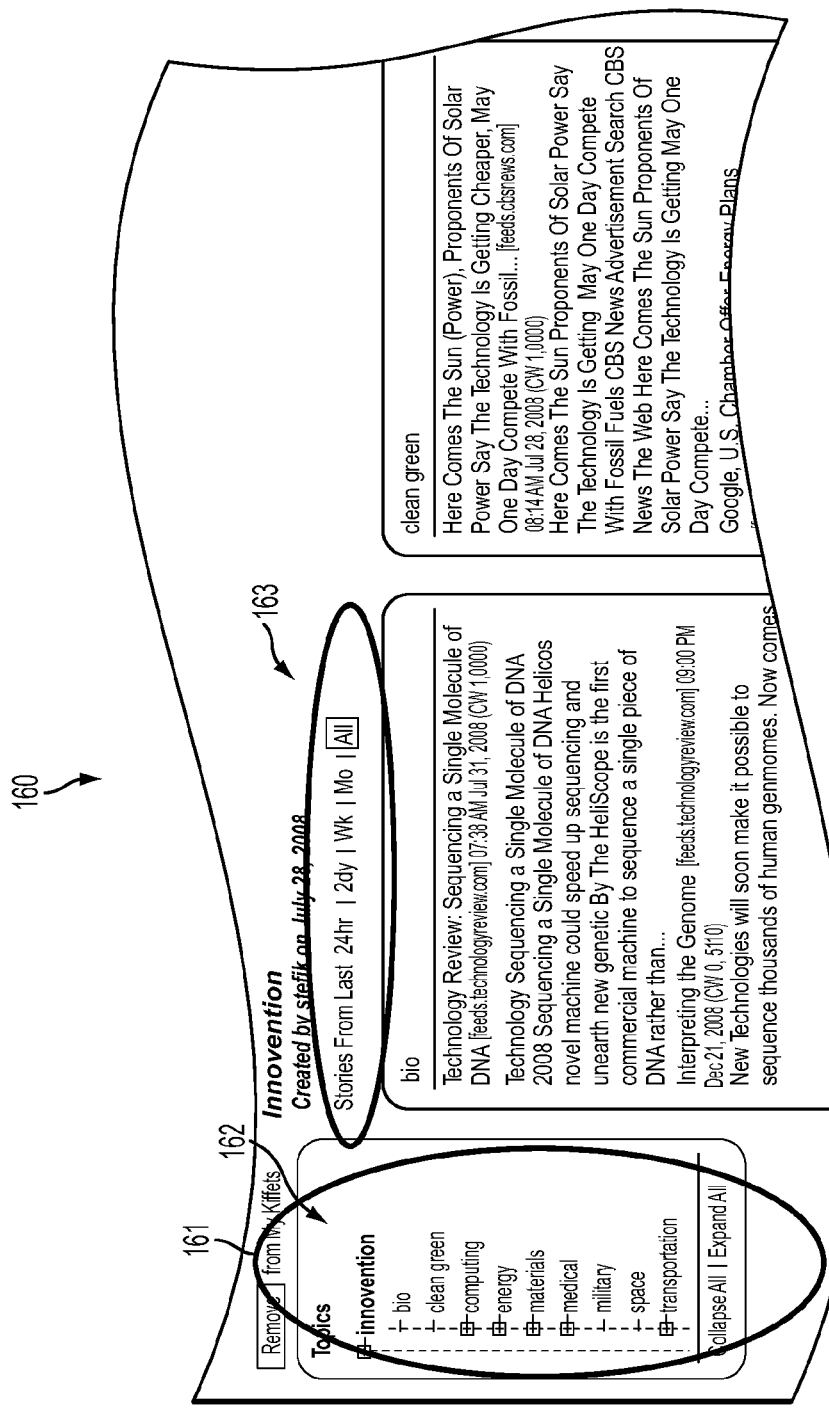
FIG. 15 is a screen shot diagram showing, by way of example, relevance-banded and time-sorted articles.

The combination of relevance banding and time sorting prioritizes relevance or recency without requiring a novice user to articulate a complex search goal. FIG. 15 is a screen shot diagram 160 showing, by way of example, relevance-banded and time-sorted articles 161. Articles in a topic are grouped into and displayed by relevance bands 162 and sorted by time within each band using a time period control 163. Articles outside a time region are filtered out based on the value of the time-period control 163.

Figure 16:
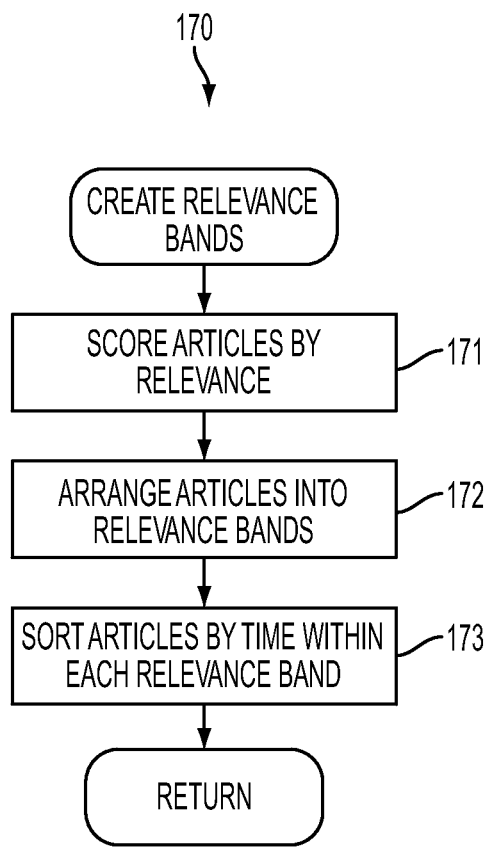
FIG. 16 is a flow diagram showing a routine for creating relevance bands for use with the method of FIG. 14.

Articles are divided into relevance bands. FIG. 16 is a flow diagram showing a routine 170 for creating relevance bands for use with the method 150 of FIG. 14. Within each topic, each article is first scored by topical relevance (step 171) and the articles are arranged into their respective relevance bands (step 172). In one embodiment, the scores are normalized on a hundred point scale and articles within each topic are divided into four discrete bands as groups of articles having the same relevancy, labeled such as "centrally-relevant," "relevant," "somewhat relevant," and "not relevant." The bands are ordered by decreasing relevancy. More or fewer bands are possible, as well as other scoring or comparison scales. The top band is for scores from 80 to 100. The next band is from 50 to 79. The next band is from 30 to 49. The lowest band is from 0 to 29. Variations on the number of bands and the particular level-boundaries of the bands are possible.

Figure 17:
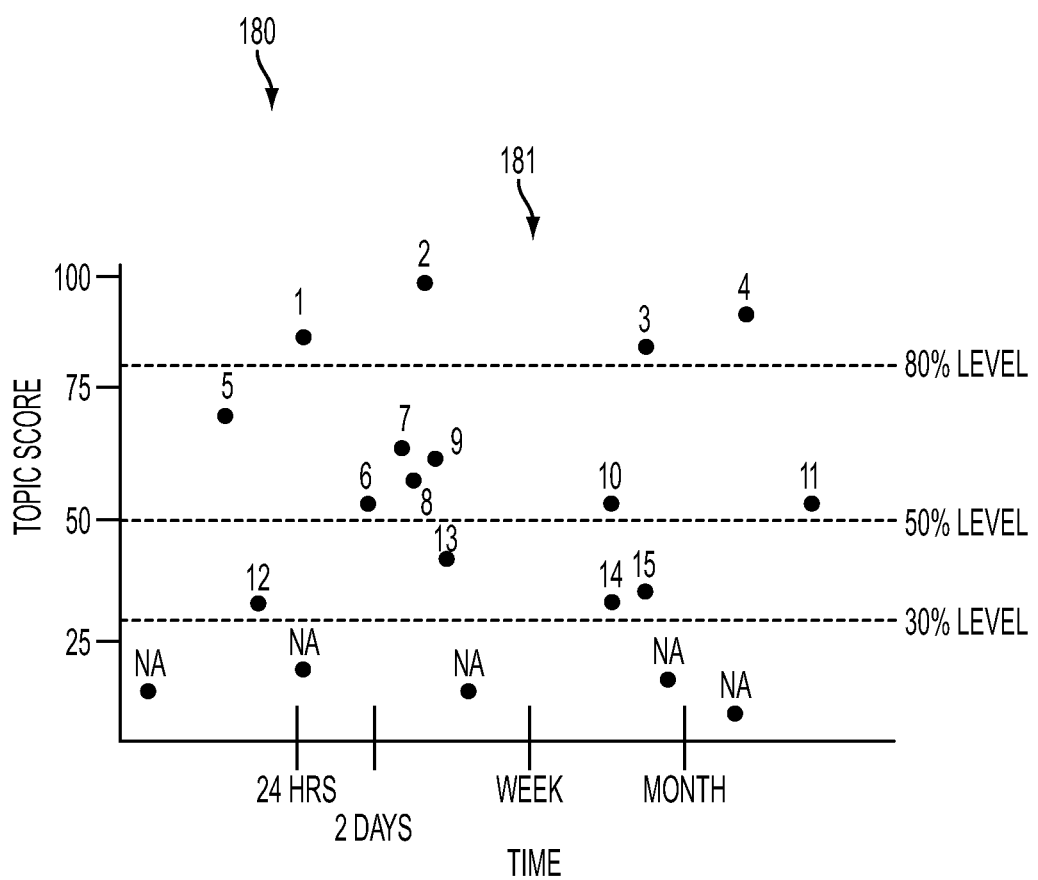
FIG. 17 is a graph showing, by way of example, article count organized by relevance band without time period controls.

Within each band, the articles are then sorted by time (step 173). FIG. 17 is a graph 180 showing, by way of example, article count organized by relevance band without time period controls 181. The x-axis represents time decreasing away from the present and they-axis represents the topic scores as a measure of relevancy. The ordering of articles without time filtering corresponds to setting the time period control 163 to select "All" time periods.

Figure 18:
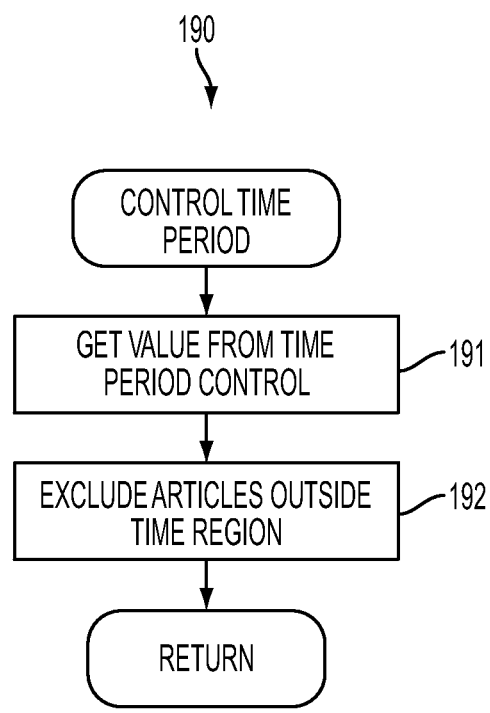
FIG. 18 is a flow diagram showing a routine for controlling time periods for use with the method of FIG. 14.

A time control is a control that limits the collected articles to a particular period. FIG. 18 is a flow diagram showing a routine 190 for controlling time periods for use with the method 150 of FIG. 14. In operation, a value selected by the user is obtained from the time period control 163 (step 191) and those articles appearing outside the selected time region are excluded from presentation (step 192).

Figure 19:
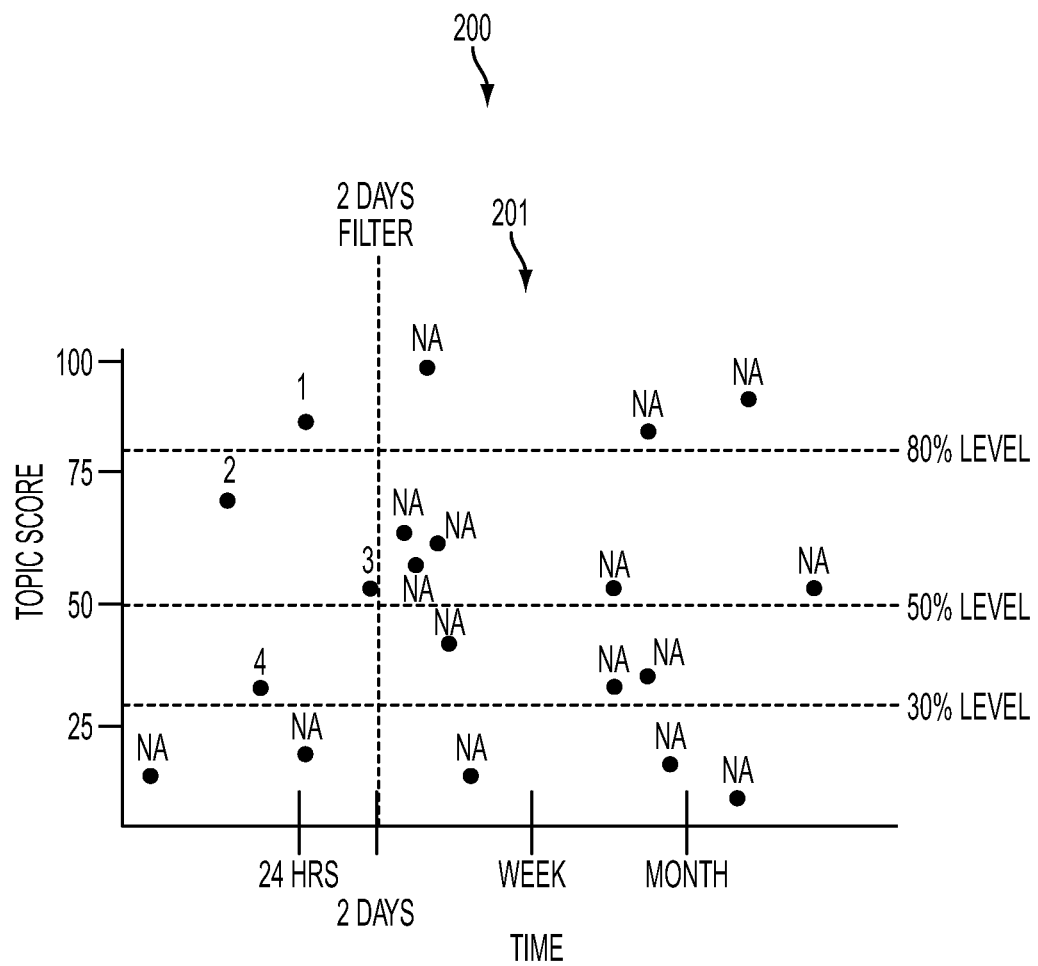
FIG. 19 is a graph showing, by way of example, article count organized by relevance band for a two-day time period.

In the simplest version, the time period control 163 starts with "now" and admits articles in one of several periods. FIG. 19 is a graph 200 showing, by way of example, article count organized by relevance band for a two-day time period 201. In one embodiment, five time periods are provided: 24 hours, two days, one week, one month, and unlimited, that is, "All" time periods. Other sets of time periods are possible, including ones that specify both beginning and ending limits, or beginning and duration limits, on the time period.

In contrast to a control that governs sorting and a control that governs degree-of-interest preference setting, as both discussed supra, the time period control 163 does not introduce trade-offs or concepts of "relevance versus time," and the apparent simplicity of this approach results in an advantage to novice users seeking to satisfy their information goals. As well, the combination of the banded relevance determination and the time-filter control is capable of satisfying all eight of the usage cases:

Hot topic.
  Case 1: News reader. The user selects the "24 hours" time period. If the topic is very hot, many articles of high topical relevance will be identified, which the system displays with the top-relevance articles presented first, sorted by date. No articles beyond the 24-hour limit will be shown. The user's goals will be met.
  Case 2: Relevance reader. The user selects the "All" time period. The system displays the articles in the top relevance band first, sorted by date. The system then displays the articles in the next relevance band. Since users have little sensitivity to variations in ordering caused by small changes in relevance values, the user's goals will be met.
Cold Topic.
  Case 3: News reader. The user selects the "24 hours" time period. There are probably few to no articles available on a cold topic. The system displays articles from the last 24 hours, with the most relevant articles, if any, presented first. Since most articles will probably be in the same low relevance band, the temporal ordering mostly satisfies the user's goals.

Case 4: Relevance reader. The user selects the "All" time period. The system displays the articles in the top relevance band first, and so on, and will thoroughly satisfying the user's goals.

Recurring topic.

Case 5: News reader. The user selects the "24 hours" time period. If the periodic topic is hot, this usage goal reduces to the Hot Topic case. If the periodic topic is cold, this usage goal reduces to the Cold Topic case. Either way, this case satisfies the user's goals.

Case 6: Relevance reader. The user selects the "All" time period. The system selects articles in the top relevance band first and sorts the articles by time. This usage case groups the articles that are in the same period together, and satisfies the user's goals.

Two-day review.

Case 7: News reader. The user selects the "2 days" time period. The system performs a banded relevance determination, but filters out all articles older than two days. If the topic is hot, the articles in the top relevance band appear and are temporally sorted. If the topic is cold, the articles in a lower relevance band are presented in temporal order. The user's goals are satisfied.

Case 8: Relevance reader. The user selects the "2 days" time period. The system performs a banded relevance determination, but filters out all articles older than two days. If the topic is hot, the articles in the top relevance band appear and are temporally sorted. If the topic is cold, the articles in a lower relevance band are presented in temporal order. The user's goals are satisfied.

In a further embodiment, a scoring method that scores using only a very small number of levels could be employed. For example, relevance scoring could be performed on only four levels: "extremely relevant," "highly relevant," "relevant," and "not relevant." No reduction to bands would be needed since there are only four levels. However, sorting within the bands would still be needed to exhibit the desired behavior on the eight usage cases.

In a further embodiment, the methodology can be applied to one or more social indexes within a social indexing system. The topical banding is applied within the context of each social index.

While the invention has been particularly shown and described as referenced to the embodiments thereof, those skilled in the art will understand that the foregoing and other changes in form and detail may be made therein without departing from the spirit and scope.

What is claimed is:

1. A computer-implemented method for using banded topic relevance and time for article prioritization, comprising:
    maintaining articles of digital information and at least one social index comprising topics that each relate to one or more of the articles;
    retrieving fine-grained topic models matched to the digital information for each topic;
    succinctly classifying the articles under the topics by testing the articles against the fine-grained topic models;
    for each topic in the at least one social index, maintaining a coarse-grained topic model comprising:
        specifying characteristic words extracted from the articles identified by the fine-grained topic models of each topic; and
        assigning scores to the characteristic words;
    for each of the articles within the topic under which the article was classified, accumulating the scores of the characteristic words into a relevancy score for that article;
    selecting only the articles within the topic having relevancy scores satisfying a minimum threshold relevancy;
    for each topic in the at least one social index, arranging the selected articles into discrete bands with each discrete band representing comparable levels of relevancy, comprising:
        setting a range of relevancy scores for each discrete band; and
        classifying each of the articles within the topic into the discrete band within whose range of relevancy scores the article's relevancy score falls;
    temporally sorting the articles within each of the discrete bands; and
    presenting the temporally-sorted articles within the discrete bands.

2. A method according to claim 1, further comprising:
    accepting a time period, which defines a temporal cut-off; and
    excluding the articles within the discrete bands falling outside the time period accepted.

3. A method according to claim 2, wherein the time periods comprise one or more of 24 hours, two days, one week, one month, and unlimited.

4. A method according to claim 1, further comprising:
    defining a normalized scale and dividing the normalized scale over the discrete bands;
    normalizing the relevancy scores over the normalized scale; and
    grouping the normalized relevancy scores into the discrete bands.

5. A method according to claim 4, wherein the discrete bands, as normalized, comprise, in order of decreasing relevancy, one or more groups of the articles labeled as centrally-relevant, relevant, somewhat relevant, and not relevant.

6. A method according to claim 1, wherein each article includes each of content and one of a publication date and indication of recency.

7. A method according to claim 1, further comprising:
    maintaining a plurality of the social indexes;
    evaluating each of the social indexes based on the topics presented within each social index; and
    presenting the articles within the discrete bands within the context of each of the social indexes.

8. A computer-implemented system for using banded topic relevance and time for article prioritization, comprising:
    an electronic database, comprising:
        articles of digital information and at least one social index comprising topics that each relate to one or more of the articles maintained for social indexing; and
        fine-grained topic models matched to the digital information for each topic;
    a processor and memory within which code for execution by the processor is stored, further comprising:
        a fine-grained classifier module succinctly classifying the articles by testing the articles against the topics using the fine-grained topic models;
        a coarse-grained classifier module configured to maintain, for each topic in the at least one social index, a coarse-grained topic model, comprising:

an extraction module configured to specify characteristic words extracted from the articles identified by the fine-grained topic models of each topic; and a scoring module configured to assign scores to the characteristic words;

a relevancy scoring module configured to accumulate, for each of the articles within the topic under which the article was classified, the scores of the characteristic words into a relevancy score for that article;

a selection module configured to select only the articles having relevancy scores satisfying a minimum threshold relevancy;

a band module configured to arrange, for each topic in the at least one social index, the selected articles into discrete bands with each discrete band representing comparable levels of relevancy, comprising:

a range of relevancy scores for each discrete band; and a discrete band classifier configured to classify each of the articles within the topic into the discrete band within whose range of relevancy scores the article's relevancy score falls; and a temporal module temporally sorting the articles within each of the discrete bands; and a user interface visually presenting the temporally-sorted articles within the discrete bands.

9. A system according to claim 8, wherein the processor and memory further comprise:

a time control comprised in the user interface accepting a time period, which defines a temporal cut-off, wherein the articles within the discrete bands falling outside the time period accepted are excluded.

10. A system according to claim 8, wherein the time periods comprise one or more of 24 hours, two days, one week, one month, and unlimited.

11. A system according to claim 8, wherein the processor and memory further comprise:

an electronically-stored normalized scale, wherein the normalized scale is divided over the discrete bands; and a normalizing module normalizing the relevancy scores over the normalized scale, and grouping the normalized relevancy scores into the discrete bands.

12. A system according to claim 11, wherein the discrete bands, as normalized, comprise, in order of decreasing relevancy, one or more of groups the articles labeled as centrally-relevant, relevant, somewhat relevant, and not relevant.

13. A system according to claim 8, wherein each article includes each of content and one of a publication date and indication of recency.

14. A system according to claim 8, wherein the database further comprises:

a plurality of the social indexes; and the processor and memory further comprise:

a multi-index evaluation module evaluating each of the social indexes based on the topics presented within each social index, wherein the articles within the discrete bands are presented within in the user interface the context of each of the social indexes.

* * * * *